United States Patent
Guillory

[11] Patent Number: 5,431,092
[45] Date of Patent: Jul. 11, 1995

[54] CORN DOG FRYER

[76] Inventor: Sheila A. Guillory, 1010 N. Booker St., Lake Charles, La. 70601

[21] Appl. No.: 213,906

[22] Filed: Mar. 15, 1994

[51] Int. Cl.$^6$ .............................. A47J 37/12
[52] U.S. Cl. ....................... 99/410; 99/413; 99/448; 99/421 V; 99/403
[58] Field of Search ............... 99/410, 403, 448, 413, 99/419, 421 R, 421 V; 220/912; 248/146; 126/30, 27

[56] References Cited

U.S. PATENT DOCUMENTS

| | | | |
|---|---|---|---|
| 673,965 | 5/1901 | Zingenberg | 248/146 |
| 1,817,351 | 8/1931 | Cookson | 99/419 |
| 1,871,654 | 8/1932 | Blier | 99/419 |
| 3,463,077 | 8/1969 | Lescure | 99/410 |
| 3,466,999 | 9/1969 | Yanez-Pastor et al. | 99/419 |
| 3,636,860 | 1/1972 | Green | 99/410 |
| 3,858,496 | 1/1975 | Downers | 99/448 |
| 3,955,487 | 5/1976 | Chetta, Jr. | 99/384 |
| 3,982,478 | 9/1976 | Szewczyk | 99/419 |
| 4,027,583 | 6/1977 | Spanek et al. | 126/30 |
| 4,032,097 | 6/1977 | Dwyer | 248/146 |
| 4,103,604 | 8/1978 | Berard | 99/342 |
| 4,211,158 | 7/1980 | Rice, Jr. | 99/419 |
| 4,430,930 | 2/1984 | Walser | 99/331 |
| 4,589,333 | 5/1986 | Murphy | 99/419 |
| 4,612,851 | 9/1986 | McManus | 99/419 |
| 4,735,135 | 4/1988 | Walker | 99/419 |

OTHER PUBLICATIONS

Presto "GranPappy" Electric Deep Fryer; Service Merchandise Catalog; p. 31.
Dazey Chef's Pot Cooker/Fryer; Service Merchandise Catalog; p. 31.

*Primary Examiner*—David A. Scherbel
*Assistant Examiner*—Patrick F. Brinson
*Attorney, Agent, or Firm*—William W. Stagg

[57] ABSTRACT

An apparatus (10) to minimize the amount of cooking oil required for the deep fat frying of single servings of corn dogs (20) over a stove top burner (25). The apparatus includes a cylindrical container (12) for holding cooking oil, a stabilizer ring (14) and supports (16) to hold the container (12) over the burner (25). A retainer (17) fitted into the container (12) holds the corn dogs (20) immersed in cooking oil in a vertical position as they fry.

3 Claims, 3 Drawing Sheets

CORN DOG FRYER

FIELD OF INVENTION

This invention relates to deep fat frying devices. More particularly, it is concerned with an apparatus and method for frying corn dogs and other snack foods in single or small serving quantities.

BACKGROUND OF THE INVENTION

Deep fat frying of foods such as corn dogs is a preferred cooking method because of the savory flavor and appearance of the foods prepared by that method. However, it has been inconvenient and uneconomical to prepare small or single servings of these deep fat fried foods on a kitchen range burner or stove top. This is chiefly due to the large volume of oil usually required for the deep fat frying of corn dogs in conventional cooking pots to achieve the desired results. In addition, the cleanup and disposal of this volume of oil after frying corn dogs in conventional frying pots makes the preparation of single servings of corn dogs inconvenient and impractical. Further, merely reducing the size of conventionally configured pots or reducing the amount of cooking oil used to prepare single servings presents additional problems to the user. Simply reducing the amount of oil in a conventional pot produces inconsistent or poor cooking results because the food is not fully covered with oil while frying. Simply reducing the pot size increases the danger of spillage and the risk of flaming the hot oil used in frying the foods.

Some small electric fryers sold under the trademark (PRESTO FRY BABY and FRY DADDY) attempt to address these needs. Other corn dog frying devices are illustrated in U.S. Pat. No. 3,858,496 to Downers, U.S. Pat. No. 4,430,930 to Walser, and U.S. Pat. No. 4,103,604 to Berard.

The PRESTO fryers are electric and cannot be used on range or stove tops. Further, the PRESTO fryers are merely a scaled down, smaller sized version of conventional deep fat fryers. They have a relatively short and wide oil container which does not readily accommodate the long tubular shape of a corn dog.

The Downers patent teaches an apparatus for holding and suspending stick-carried foods in a cooking pot containing a frying medium which utilizes stick clips mounted to a ring conforming to the shape of the cook pot. The Walser patent teaches a commercial sized fryer for the production and the cooking of many corn dogs on an assembly line type basis. The Berard patent illustrates typical food fryer and basket devices. The aforementioned devices do not teach an apparatus for deep fat frying of corn dogs that will allow a reduced volume of cooking oil to facilitate single serving cooking.

Other frankfurter cookers for stove top use are shown in U.S. Pat. No. 3,955,487 to Chetta and U.S. Pat. No. 4,612,851 to McManus. These devices teach methods to retain frankfurters over a heat source to achieve grilling effects while cooking. They do not teach an apparatus to facilitate deep fat frying of single servings.

Consequently, a need exists for an improved deep fat fryer for use on a stove top which will allow efficient frying of single or small servings of corn dogs in a reduced volume of cooking oil.

SUMMARY OF THE INVENTION

The present invention is designed to satisfy the aforementioned needs. The invention will allow the deep fat frying of small servings of corn dogs which will have the flavor and appearance inherent in that cooking method. It incorporates a relatively tall narrow container for the cooking oil and a stabilizer ring for holding the oil container above the stove top burner. The tall narrow container allows the food to be fried in a reduced volume of cooking oil compared to conventional fryers. The stabilizer ring allows the narrow container to be safely used on stove tops. The stabilizer ring will provide stability to the fryer and will prevent the container from tipping over. In addition, the invention incorporates a corn dog retainer fitted over the top of the container to hold the corn dogs in the hot oil and prevent the corn dogs from floating while frying.

Therefore, it is an object of this invention to provide an apparatus for frying single servings of corn dogs without resorting to a separate electric fryer. It is another object of this invention to provide a frying apparatus that will reduce the volume of cooking oil required for efficient deep fat frying. It is another object of this invention to provide a stove top frying device that is small but stable over a stove top burner. It is still another object of this invention to provide a deep fat fryer that reduces the mess, clean up time and cooking oil storage problems associated with conventional deep fat fryers. Finally, it is an object of this invention to provide a device that will make deep fat frying of single servings of corn dogs more practical.

DESCRIPTION OF THE PREFERRED EMBODIMENTS

Figure 1:
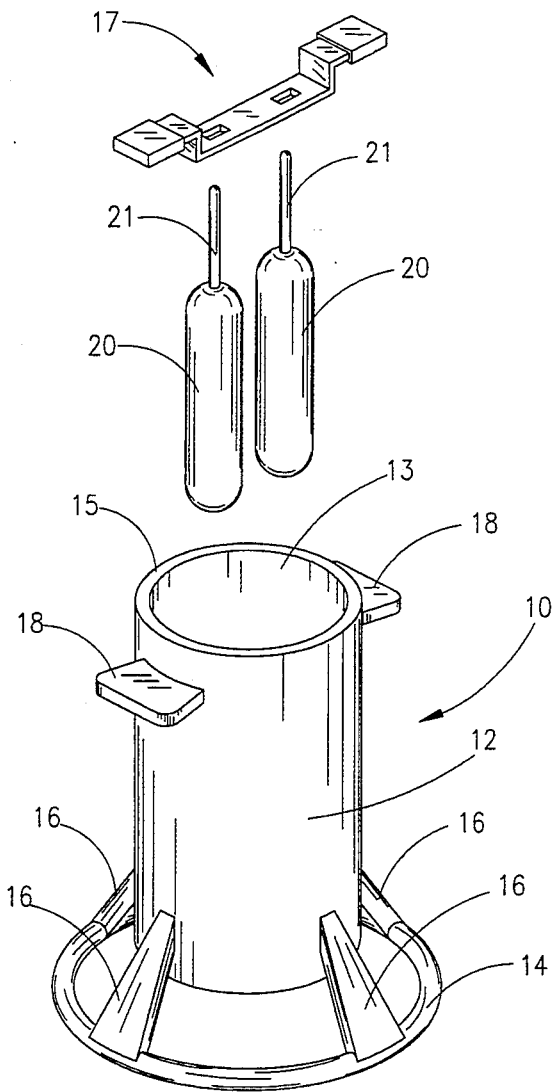
FIG. 1 is a perspective view of the corn dog frying apparatus.

Referring now to the drawings, and more particularly to FIG. 1, there is shown in perspective the preferred embodiment of the corn dog frying apparatus 10. The apparatus 10 consists of a substantially cylindrical container 12 to retain the cooking oil for the deep fat frying of a corn dog 20. A container support and stabilizer ring 14 is attached to the container 12 by a plurality of struts 16. The container, struts and stabilizer ring are preferably constructed of aluminum though stainless steel and other materials suitable for cooking utensils may be utilized. Handles 18, preferably of a hard heat resistant plastic, are attached to opposite sides of the container 12 to facilitate handling of the apparatus 10. A single handle could also be utilized. A corn dog retainer 17 is shown for receiving the stick 21 of a corn dog 20 placed in the cooking oil filled container 12. The retainer will prevent floating or displacement of the corn dogs 20 while they are frying to facilitate even cooking.

The preferred embodiment of container 12 has circular interior sides 13 and an upper rim 15 and the container 12 is configured so that its interior diameter and depth is sufficient to contain a quantity of cooking oil sufficient to fully immerse at least one vertically positioned corn dog below the container rim is for frying. That is, the container 12 is configured so that its interior diameter and depth will substantially conform to the shape of the corn dogs 20, yet afford a sufficient clearance between the container sides 13 and corn dogs 20 and a sufficient clearance between corn dogs 20 and the container rim 15 to allow hot oil to circulate around and over the corn dogs 20 while they are frying. A container 12 having an interior diameter of four inches and a depth of seven inches is thought to be sufficient to allow for the efficient frying of a serving of two corn dogs at one time. The cooking oil required for efficient frying being a function of the container dimensions and the oil volume displaced by the corn dogs upon full immersion in the cooking oil.

Figure 2:
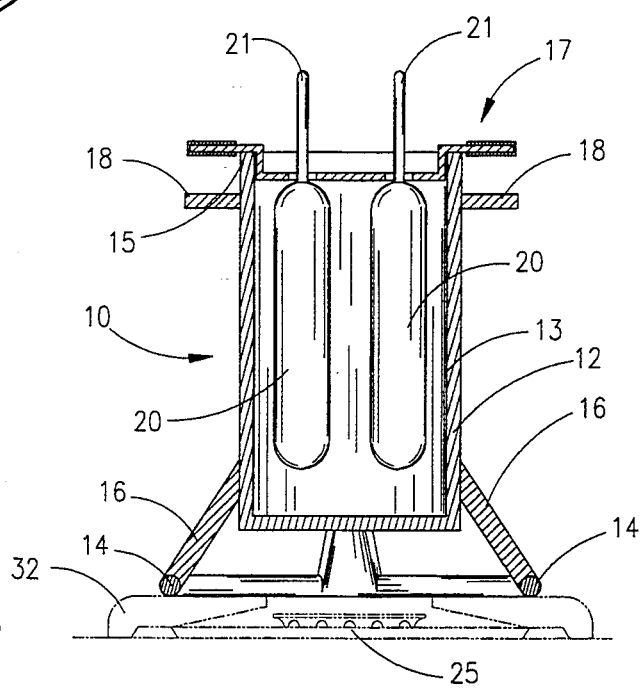
FIG. 2 is a cross-sectional view of the corn dog frying apparatus.

FIG. 2 is a cross-sectional view of the corn dog frying apparatus 10 in place over a stove top with the stabilizer ring 14 and struts 16 holding the container 12 above the stove top burner 25. The corn dogs 20 are held in place by corn dog retainer 17. The stabilizer ring 14 has a diameter substantially larger than the diameter of the container 12 and is typically larger than the diameter of a typical stove top burner so that the ring rests on the burner rack 32 to support the container 12 above the burner 25 and prevent the apparatus 10 from tipping over while in use. It is thought that supporting the container 12 one inch above the ring 14 is sufficient for stability and to allow good transfer of heat from the burner 25 to the container 12. The stabilizer ring 14 may also be sized to have a diameter slightly less than a stove burner rack to support the container on the burner rack above the burner.

Figure 3:
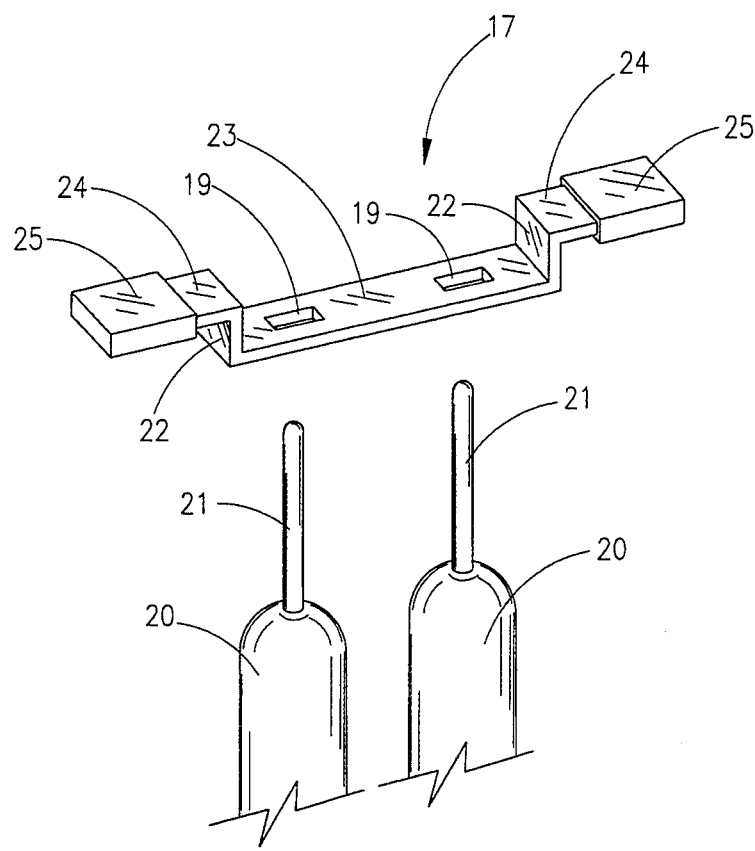
FIG. 3 is a top view of the corn dog retainer.

The retainer clip 17 is shown in FIG. 3. It consist of a C-shaped flat metal bar having a lower segment 23 which transcends to a web segment 22 and a flange segment 24 at each end of the corn dog retainer 17. The length of the lower segment 23 is substantially the same as the diameter of the container 12. The web segments 22 displace horizontally inwardly, parallel to the lower segment 23 so that the lower segment 23 is placed in the container 12 and to allow the retainer 17 to fit tightly against the inside of the container rim 13. When the retainer 17 is in place, the flange segments 24 at each end of the retainer 17 rest on the rim 13 of the container 12. The lower segment 23 of the retainer 17 has slots 19 to receive the stick 21 of a corn dog 20 to support the corn dog 20 and prevent flotation and displacement of the corn dog while it is cooking. A plastic heat resistant handle 25 is attached to each flange segment 24 to facilitate handling of the retainer 17.

Figure 4:
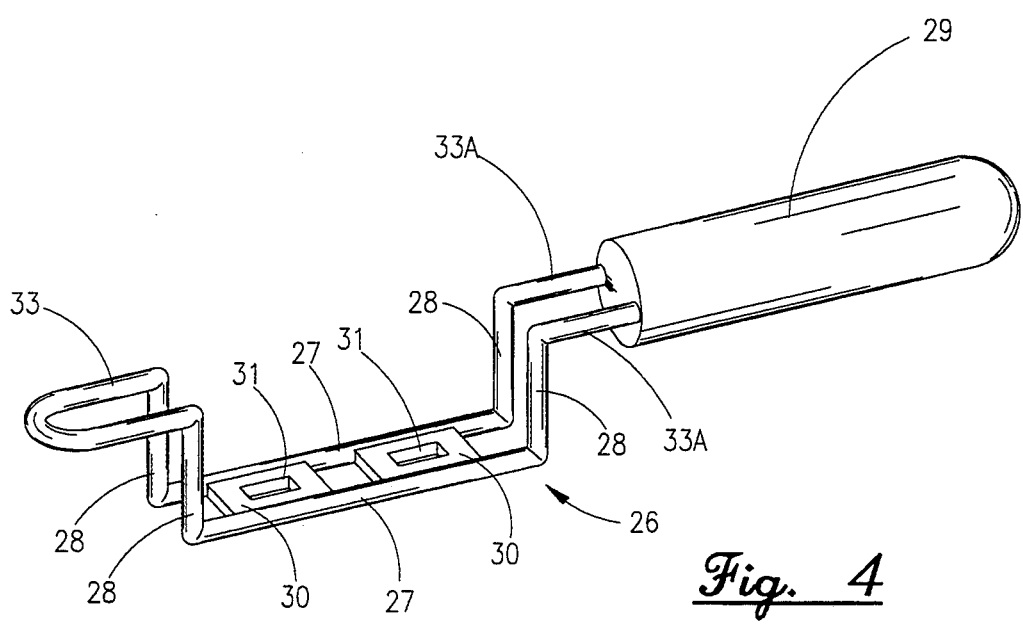
FIG. 4 is an alternate embodiment of the corn dog retainer.

FIG. 4 shows an alternate embodiment 17A of the retainer 17. It is comprised of a stiff wire frame 26 bent to produce parallel wire segments 27. The wire segments have inwardly displaceable vertical segments 28 and supports 33 and 33A at opposite ends. The frame 26 fits inside the container 12 with the supports 33 and 33A resting on the container rim 15. A heat resistant handle 29 is attached to the frame 26 adjacent to the support 33A. The wire segments 27 are held parallel to each other by strap segments 30 having slots 31. The corn dog stick 21 is inserted through the slots 31 to secure the corn dog 20 in place for frying.

Figure 5:
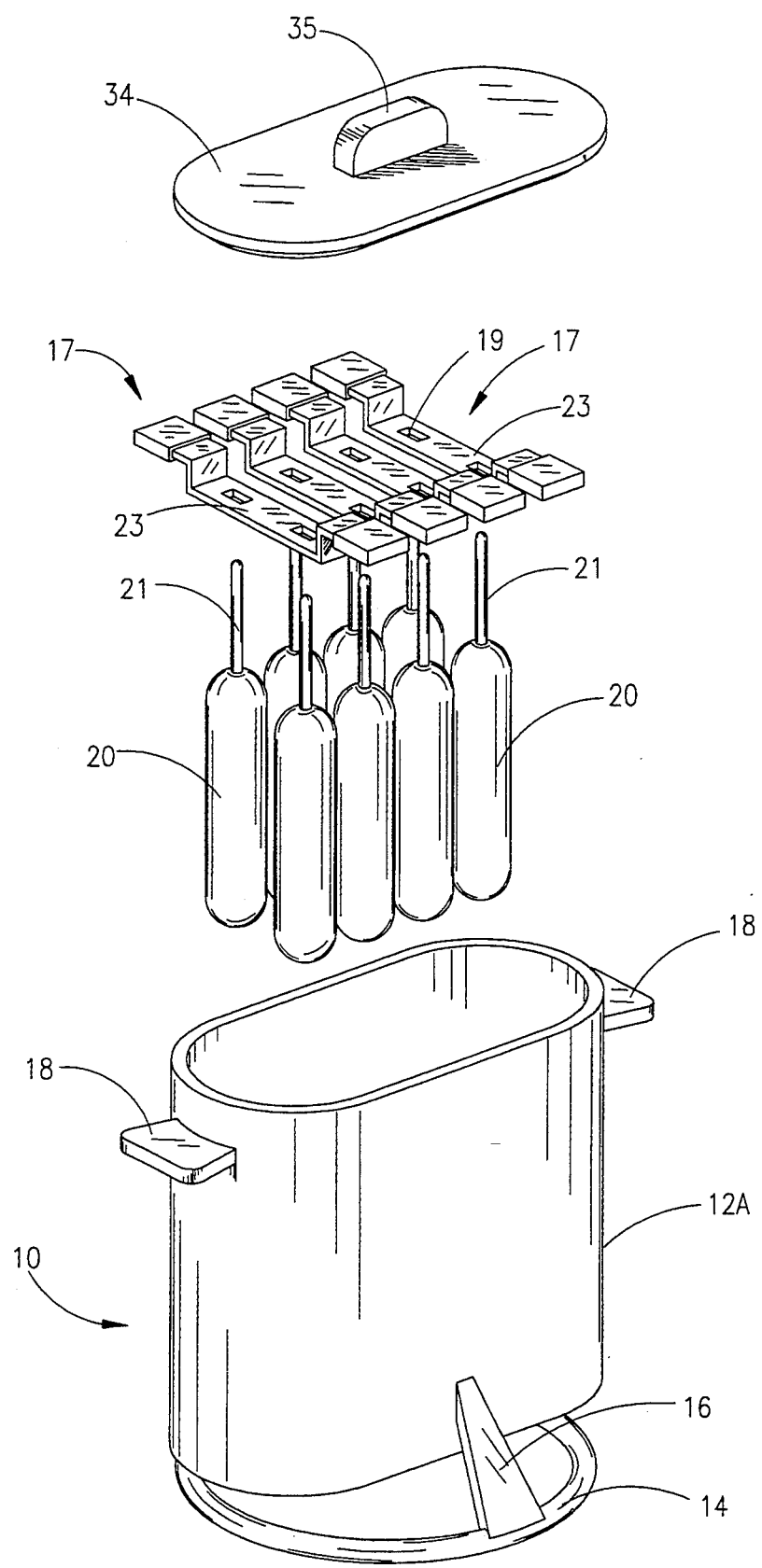
FIG. 5 is a perspective view of an alternate embodiment of the corn dog frying apparatus.

FIG. 5 is an alternate embodiment of the apparatus 10. It shows a container 12A, similar to container 12 described herein, which is configured for frying a larger serving of corn dogs 20. The container 12A has a depth slightly larger than the length of a corn dog 20 to allow the flow of cooking oil over the top of a corn dog while frying and, rather than circular, the container 12A is oval shaped such that its width is approximately one-half of its length. It is thought that container 12A having a width of four inches and a length of eight inches is sufficient for efficiently frying a serving of up to eight corn dogs at one time.

A circular stabilizer ring 16 and struts 14 are shown which provides stability and support for the oval shaped container 12A above the stove top burner. Heat resistant handles 18 facilitate the handing of the apparatus in use. A plurality of corn dog retainers 17 are shown having a lower segment length 23 of substantially the same width as container 12A which are secured to the container 12A in the manner previously described for container 12. A cover 34 having a handle 35 may be provided for the container 12A for use should the apparatus be used for cooking other food types.

It is thought that the corn dog frying apparatus and many of its intended advantages will be understood from the foregoing description and it will be apparent that various changes may be made in the form, construction and arrangement of the parts thereof without departing from the spirit and scope of the invention or sacrificing all of its material advantages, the form described herein being merely a preferred or exemplary embodiment of the invention.

I claim:

1. A fryer for frying stick supported batter wrapped frankfurters in cooking oil over a stove top burner comprising:

a) A container for holding a quantity of cooking oil, said container having a bottom, circular interior sides and a rim, said interior sides of container being configured to conform substantially to the shape of said frankfurters, with the dimensions of said interior sides being such as to allow only a clearance space between said frankfurters and said interior sides of an amount sufficient to allow full immersion of at least one vertically positioned batter wrapped frankfurter in said cooking oil below said rim;

b) a stabilizer ring of sufficient diameter to prevent tipping of said container;

c) a plurality of struts mounted between said stabilizer ring and said container for centering said container within said stabilizer ring and for elevating said container bottom above said stabilizer ring and for supporting said container over said burner; and d) means for retaining said batter wrapped frankfurters within said cooking oil filled container so that said frankfurters remain immersed in said cooking oil in a vertical position parallel to the sides of said container, wherein said means for retaining said batter wrapped frankfurters includes a wire frame comprised of a handle and parallel horizontal wire segments protruding from said handle, said wire segments each having vertically positioned, outwardly displaced portions which transition to form horizontal support portions at each end on said wire frame and a plurality of straps, said straps having a slot to receive said sticks from said frankfurters, said frame being positioned within said container by inwardly displacing said vertically positioned, outwardly displaced portions so as to allow said frame to fit tightly within said container with said horizontal support portions resting on said container rim.

2. A fryer as recited in claim 2, wherein said rim supported wire frame includes a heat resistant plastic handle.

3. In a container for frying stick mounted batter wrapped frankfurters, a retainer for holding said stick mounted frankfurters suspended in cooking oil comprising:

a) a flat metal bar, said bar having a lower segment of substantially the same length as the inside rim width of said container, said bar further having a vertical web segment and an upper longitudinal flange segment at each end of lower segment, said web segments being displacable horizontally inwardly with respect to said container so as to allow said lower segment of said retainer to fit tightly against the inside of said container with said flange segments resting on the rim of said container, said lower segment having a plurality of slots, said slots having dimensions greater than the width of said frankfurter sticks for receiving the free end of said sticks to vertically position said frankfurters in said oil to prevent the displacement of said frankfurters as said frankfurters are cooking whereby, said frankfurters are free to float in said oil to the limit of said retainer; and b) heat resistent handles mounted to the ends of said upper longitudinal flange segments.

* * * * *